United States Patent
Merello

(10) Patent No.: US 11,890,737 B2
(45) Date of Patent: Feb. 6, 2024

(54) OVERHEAD DRILL AND ANCHOR PRESS

(71) Applicant: Peter Justin Merello, Las Vegas, NV (US)

(72) Inventor: Peter Justin Merello, Las Vegas, NV (US)

(*) Notice: Subject to any disclaimer, the term of this patent is extended or adjusted under 35 U.S.C. 154(b) by 652 days.

(21) Appl. No.: 17/117,036

(22) Filed: Dec. 9, 2020

(65) Prior Publication Data

US 2021/0229254 A1 Jul. 29, 2021

Related U.S. Application Data

(63) Continuation-in-part of application No. 16/285,055, filed on Feb. 25, 2019, now abandoned, which is a continuation of application No. 14/884,764, filed on Dec. 28, 2015, now Pat. No. 10,245,715.

(51) Int. Cl.
| | |
|---|---|
| *B25F 3/00* | (2006.01) |
| *B25D 17/32* | (2006.01) |
| *B23B 39/14* | (2006.01) |
| *B23B 41/00* | (2006.01) |
| *B25H 1/00* | (2006.01) |

(52) U.S. Cl.
CPC ............... *B25F 3/00* (2013.01); *B23B 39/14* (2013.01); *B23B 41/00* (2013.01); *B25D 17/32* (2013.01); *B25H 1/0035* (2013.01)

(58) Field of Classification Search
CPC .......... B25F 3/00; B23B 39/14; B23B 41/00; B25D 17/32; B25H 1/0035
USPC ...... 173/184, 29, 30, 31, 38, 39, 45, 50, 52, 173/81, 141, 213, 171; 227/64, 69, 99, 227/140, 107, 156
See application file for complete search history.

(56) References Cited

U.S. PATENT DOCUMENTS

| | | | |
|---|---|---|---|
| 2,168,905 A | 8/1939 | Lear | |
| 2,669,135 A | 2/1954 | Moore | |
| 3,173,315 A * | 3/1965 | Fuldner | G05B 19/373 |
| | | | 91/170 R |
| 3,399,734 A | 9/1968 | Folinsbee | |
| 4,052,132 A | 10/1977 | Oates | |
| 4,090,803 A | 5/1978 | Haley | |
| 4,694,930 A | 9/1987 | Kishi | |
| 5,060,532 A | 10/1991 | Barker | |
| 5,117,544 A * | 6/1992 | Kousaku | G05B 19/182 |
| | | | 29/DIG. 56 |
| 5,803,550 A | 9/1998 | Watson et al. | |
| 5,960,531 A | 10/1999 | Mora et al. | |
| 6,254,317 B1 | 7/2001 | Chang | |
| 6,315,059 B1 * | 11/2001 | Geldean | E21B 7/028 |
| | | | 173/147 |
| 6,460,652 B1 | 10/2002 | Piipponen | |

(Continued)

*Primary Examiner* — Robert F Long

(57) ABSTRACT

The Overhead Drill and Anchor Press is a single mobile mechanism designed for installation of anchors into a construction surface which is overhead and out of reach of the installer. The overhead drill and anchor press may include a mast, a turret assembly, a controller, and at least one drill. The overhead drill and anchor press can execute the anchor installation sequence automatically or manually with a controller by moving the drill position to drill the hole and set the anchor. The controller may be equipped with a digital display of the turret mounted camera for monitoring the process from the ground. The entire assembly may be manually pushed between target.

15 Claims, 16 Drawing Sheets

(56) References Cited

U.S. PATENT DOCUMENTS

| | | | |
|---|---|---|---|
| 6,523,245 B2 | 2/2003 | Whiten et al. | |
| 7,369,916 B2 | 5/2008 | Etter et al. | |
| 9,327,375 B2 | 5/2016 | Yamane | |
| 11,224,951 B2* | 1/2022 | Oberoi | F16B 2200/91 |
| 11,364,639 B2* | 6/2022 | Seo | B25J 9/041 |
| 2009/0003955 A1 | 1/2009 | Nakagawa et al. | |
| 2012/0247836 A1 | 10/2012 | Wilson et al. | |
| 2013/0228377 A1 | 9/2013 | Kuittinen et al. | |
| 2013/0319765 A1 | 12/2013 | Piipponen et al. | |
| 2014/0014609 A1 | 1/2014 | Stakor et al. | |
| 2014/0037415 A1 | 2/2014 | Zuritis | |
| 2014/0257353 A1* | 9/2014 | Whitman | A61B 17/07207 606/167 |
| 2018/0326507 A1* | 11/2018 | Halvorsen | B23B 39/08 |
| 2021/0379767 A1* | 12/2021 | Kang | B25J 9/1679 |

\* cited by examiner

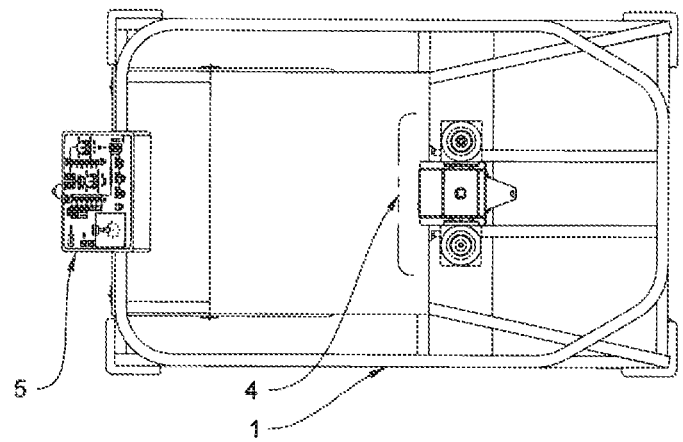
FIG. 5
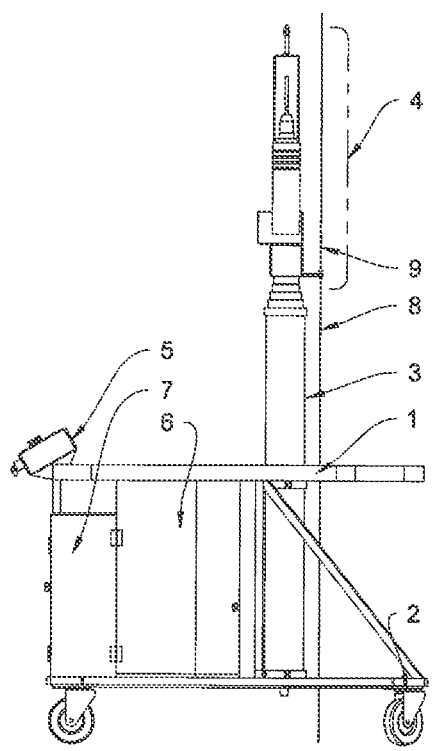 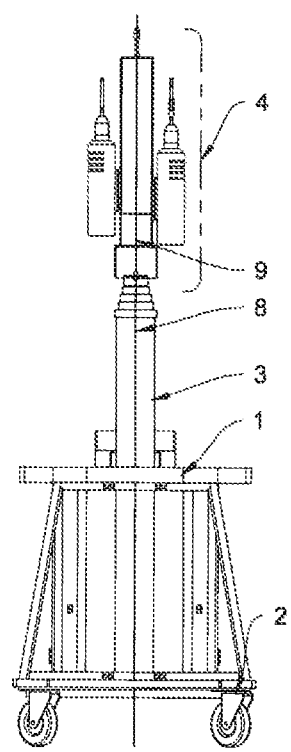 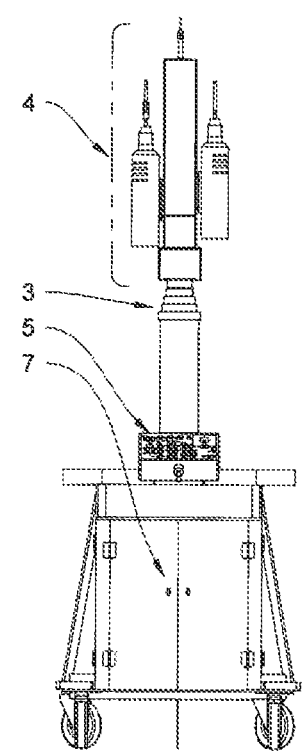
FIG. 2  FIG. 3  FIG. 4

SYMBOL LEGEND

← 512

← 513

← 514

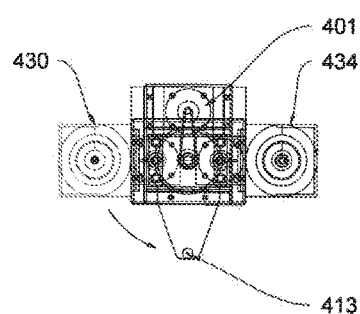 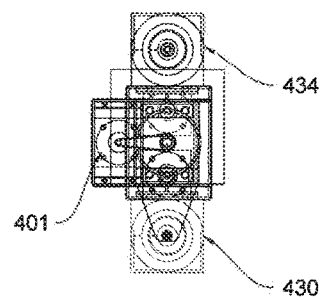 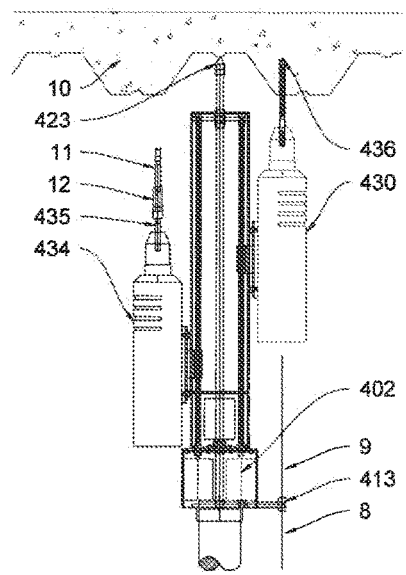
FIG. 10A　　　FIG. 10B　　　FIG. 10C
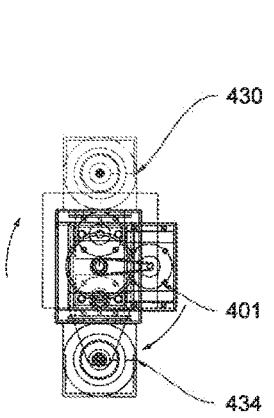 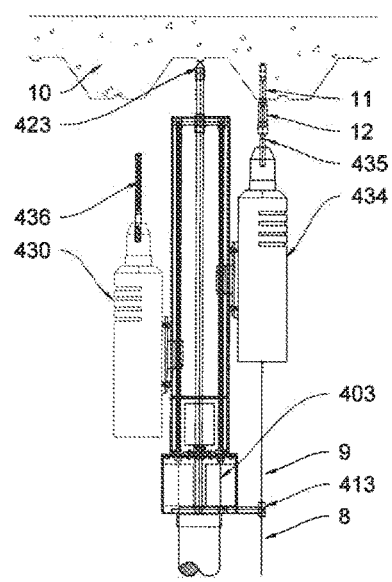 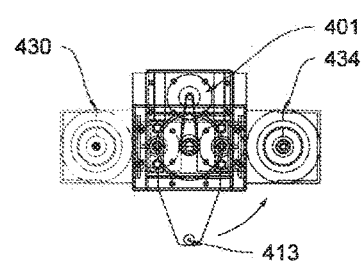
FIG. 10D　　　FIG. 10E　　　FIG. 10F

OVERHEAD DRILL AND ANCHOR PRESS

RELATED APPLICATION DATA

This application is a continuation-in-part of U.S. patent application Ser. No. 16/285,055, filed Feb. 25, 2019, which is in turn a continuation of U.S. patent application Ser. No. 14/884,764, filed Dec. 28, 2015, and issued as U.S. Pat. No. 10,245,745 B2 on Apr. 2, 2019; these applications are incorporated herein in the entirety.

FIELD OF THE INVENTION

The present invention pertains to power tools used in the field of construction, particularly a composition of tools onto a single mobile mechanism needed for installation of anchors into concrete and/or non-concrete surfaces overhead out of reach of the installer.

BACKGROUND OF THE INVENTION

In the field of construction, the conventional method of drilling overhead to install anchors for support of overhead equipment, building components, and utilities would start by elevating a person to within reach of the surface for the anchor to be installed. Outfitted with the proper personal protective equipment, eye protection, ear protection, and respiratory protection, the installer would use a drill and drill bit capable of penetrating the surface to a prescribed depth, followed by installing the anchor, and using an additional set of tools to properly set the anchor before attaching the load. The most commonly used tool for drilling into the surface is the rotary hammer commonly known as the "hammer drill". With this tool, which has weight of its own, requires the worker to apply additional upward force to activate the hammering action of the tool. The consistent force applied by the worker must be maintained against the surface as the drill advances. The "hammer drill", by nature, also reverberates through the workers hands from the percussive action which must also be overcome through the physical strength all the while generating harmful silica dust that should be avoided. In addition to the physical aspect of this work, the users access the work surface by standing on a ladder or lift, putting the worker at additional risk of injury. This activity is generally performed many times on a project resulting in tremendous stress and strain on a worker's muscles, joints, and tendons, resulting in unsafe conditions and loss of time and production due to fatigue and injuries.

The layout and identifying of locations of the drilled holes and anchors have evolved in the industry today. The traditional method of identifying locations would be to hand measure from control lines with tape measure and marking the point on the ground or floor. This method is time consuming and can lose additional accuracy when transferring the mark to the surface to be drilled. Today, with the use of CAD software, virtual 3D modeling of the building, building components, and utilities within have become common in the industry. With this virtual building information model (also known as "BIM"), the hole and anchor locations can be preplanned and imbedded with X, Y, Z coordinates relative to the building itself. GPS and Laser measuring tools are an industry standard in construction and integrating the BIM modeled points has become the most effective method for point layout at all stages of the construction process.

SUMMARY OF THE INVENTION

The purpose of this invention is to provide an operator with an apparatus and system of all tools and components into one robotic device needed to drill a hole or drill a hole and install an anchor into overhead surfaces. The solution for drilling holes overhead is accomplished by configuring a drill loaded with the appropriate drill bit to a telescopic lift. Mitigating the airborne silica dust generated from drilling a hole into concrete is accomplished by incorporating a dust collector with the means to catch and contain said dust. A second drill loaded with the appropriate setting tool and anchor to the telescopic mast provides an anchor setting solution. The present invention combines these three components drill #1, drill #2, and a dust collector into a single robotic turret mounted to a telescopic mast for lifting the assembly into reach of the working surface. Integration of the current industry methods of point layout is provided by configuring the cart with a mounting means for a prism to be used for location tracking by a "Total Station." Motorized omnidirectional wheels are incorporated into the cart frame design for the purpose of self-navigating the present Overhead Drill and Anchor Press invention throughout and about the project. This invention is also designed to carry all of the necessary equipment needed for this installation process and easily move between target locations, manually or autonomously using motorized wheels and sensors mapping its surroundings. The Overhead Drill and Anchor Press may be designed to execute its drill or drill and install anchor sequence automatically or manually with an on-board controller.

The installation of an anchor generally requires a layout of locations which is easily done along the floor placing a mark where the anchor is to be located above. The Overhead Drill and Anchor Press may be equipped with a laser that points down (for aligning to a mark on the floor) and up respectively to show that place on the surface above.

The Overhead Drill and Anchor Press has a telescopic mast which is designed to extend straight up carrying the tools needed for drilling a hole and pressing and setting the anchor into said hole. The telescopic mast is extended by pressing air from the air reservoir tank, stored on a cart, and lowered by pulling the air back out of the mast. This operation is one of the sequencing steps initiated by the controller.

The present invention is equipped with a turret mounted to the top of the telescopic mast which operates the 2 drills attached to either side and is equipped with a laser and a camera. The first drill is loaded with the appropriate drill bit and programmed for drilling into the surface. The second drill is loaded with the appropriate setting tool and anchor, and programmed to press the anchor into the hole and set the anchor by rotatory torque or percussion depending on the requirements of the anchor.

In one embodiment, a drill may be loaded with the appropriate drill bit and used to drill into the surface and to press the anchor into the hole, and then loaded with the appropriate setting tool and anchor and programmed to press the anchor into the hole and set the anchor.

The cart is equipped with casters for easy movement and is compartmentalized for protection of the power supply system and the air tank system with a sturdy top and floor base for carrying a supply of anchors needed for the project.

Further objects, features, and advantages of the present invention over the prior art will become apparent from the detailed description which follows, when considered with the figures provided herein.

DESCRIPTION OF THE DRAWINGS

FIG. 2 is an elevation view of the right side of the overhead drill and anchor press.

FIG. 3 is an elevation view of the front of the overhead drill and anchor press.

FIG. 4 is an elevation view of the back of the overhead drill and anchor press.

FIG. 5 is a plan view of the top of the overhead drill and anchor press.

FIG. 10A is an enlarged top view of the turret in operation mode in the turret start position with the laser in position of the target.

FIG. 10B is an enlarged top view of the turret in operation mode at "sequence 2" with the drill #1 in position of the target.

FIG. 10C is an enlarged elevation view of the right side in operation mode at "sequence 4" with the drill #1 advanced into the prescribed drilling depth of the surface.

FIG. 10D is an enlarged top view of the turret in operation mode at "sequence 6" with the drill #2 in position of the target, FIG. 10E is an enlarged elevation view of the right side in operation mode at "sequence 8.1" with the drill #2 and anchor advanced into the prescribed depth of the surface.

FIG. 10F is an enlarged top view of the turret in operation mode at "sequence 10" rotated back to the start position with the laser in position of the target.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1A:
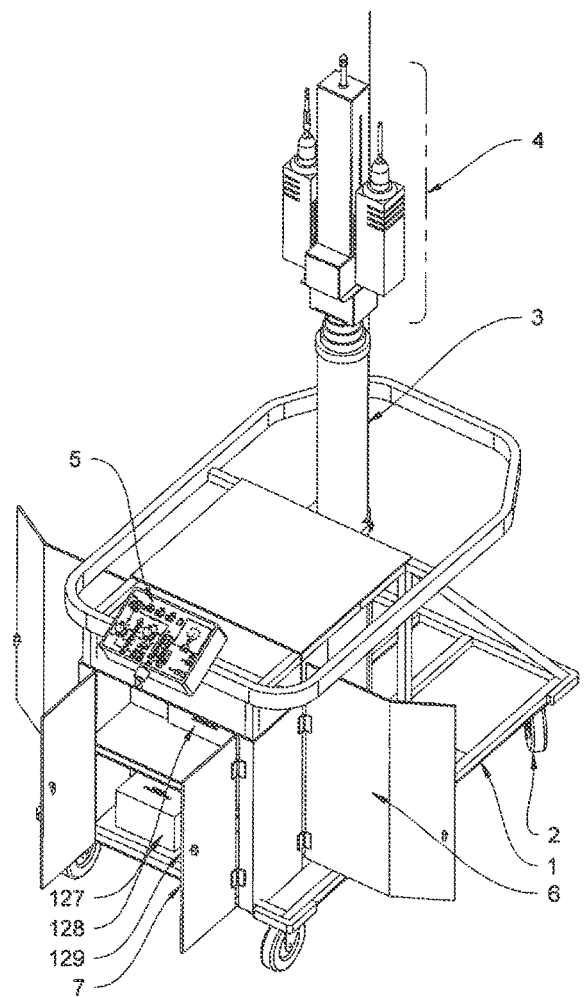
FIG. 1A is an isometric view with the compartment doors in the open position. View is looking at the right rear.
Figure 1B:
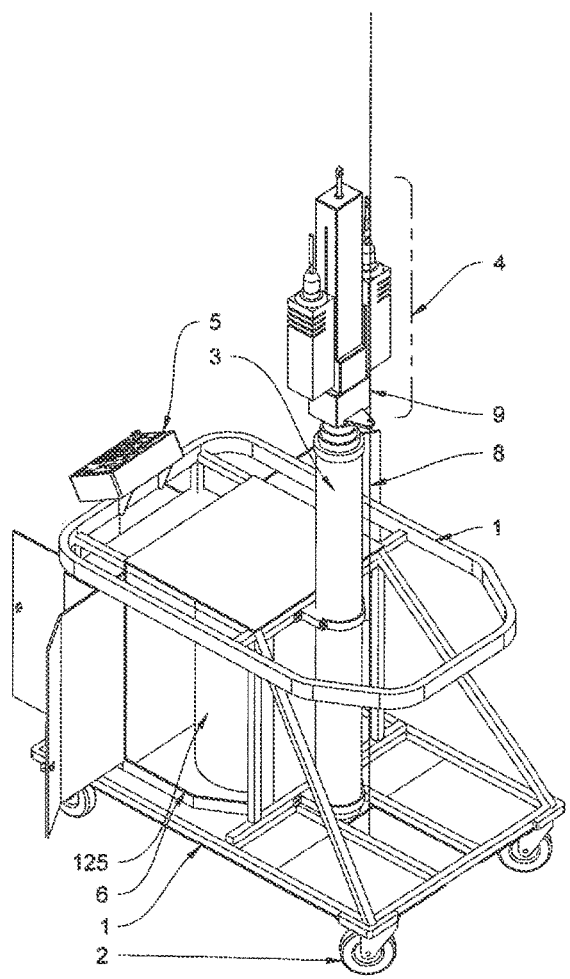
FIG. 1B is an isometric view with the compartment doors in the open position. View is looking at the right front.
Figure 6:
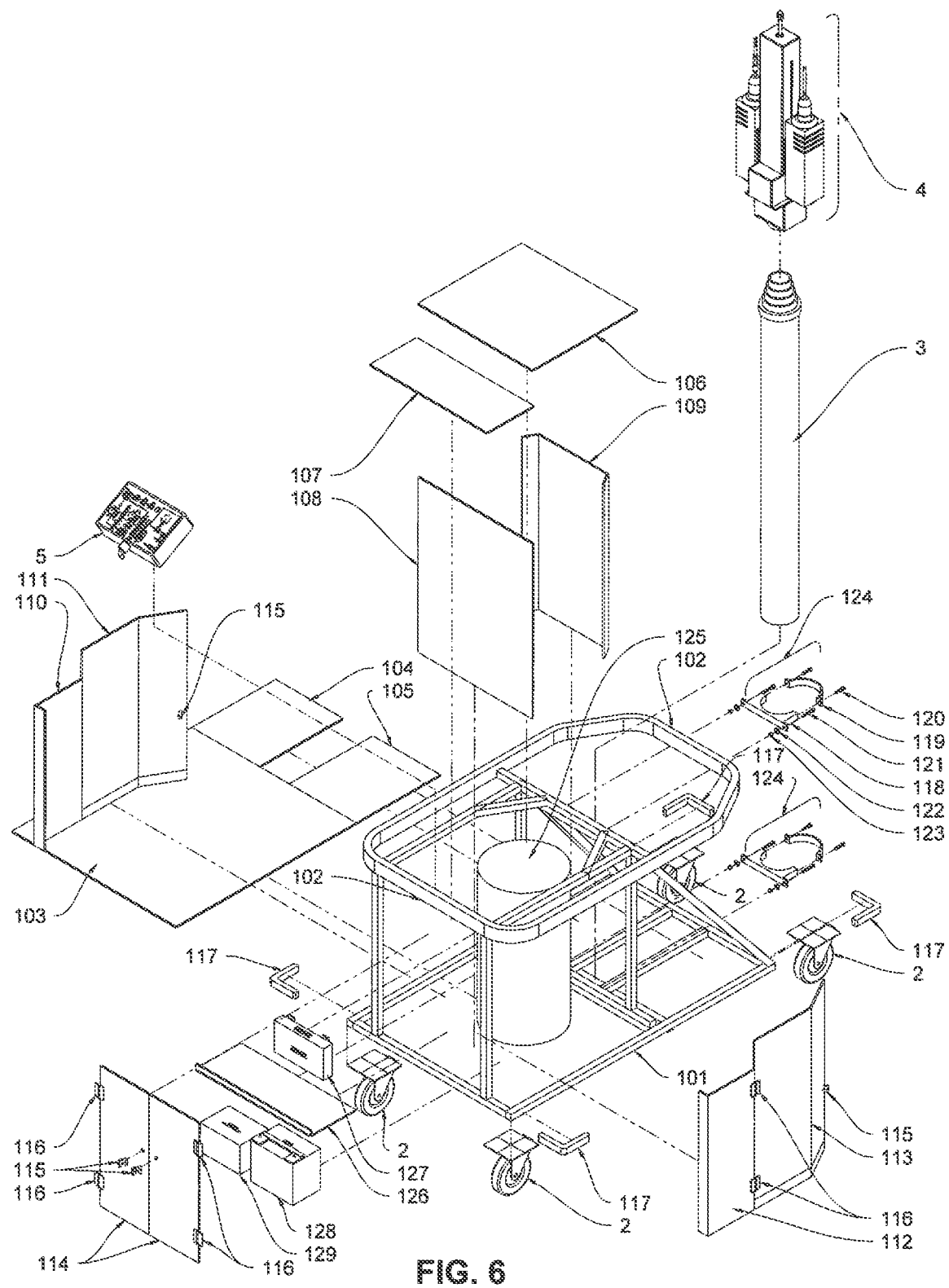
FIG. 6 is an exploded view of the preferred embodiment of the overhead drill and anchor press.
Figure 18:
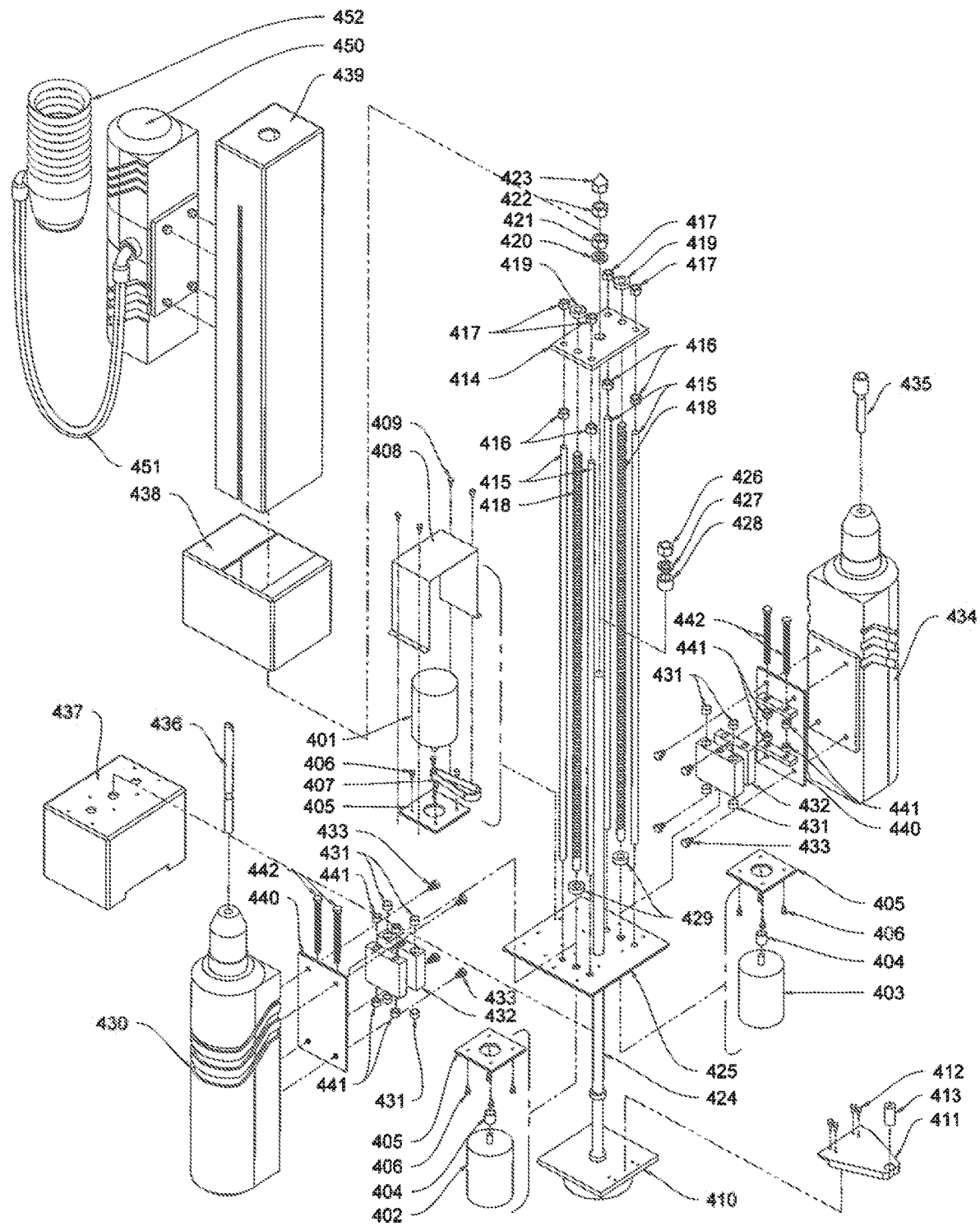
FIG. 18 is and exploded view of a preferred embodiment of a turret component to the overhead drill and anchor press.

FIG. 1A and FIG. 18 are isometric views showing the preferred embodiment of the overhead drill and anchor press and includes these major components: a compartmentalized cart on casters 1, a telescopic mast 3, a turret assembly 4, a controller 5, an air reservoir tank 125, a battery 128, a battery charger 129, and a DC power supply 127. The entire assembly of the embodiment of the overhead drill and anchor press is designed to be manually pushed between target locations and sized to fit through standard framed door openings on a construction project, FIG. 6 is an exploded view of the preferred embodiment of the Overhead Drill and Anchor Press of the present invention. This view illustrates the exploded components of the cart and placement of the major components: the telescopic mast 3, the turret assembly 4, the controller 5, the air reservoir tank 125, the battery 128, the battery charger 129, and the DC power supply 127. The cart chassis framing 101 is wielded light weight metal and offers the support to all before mentioned major components. The cart handrail 102 is wielded to the cart chassis framing 101. The cart handrail 102 has rounded corners for handling and is shaped so that the controller 5 may be placed at any location along the straight sections (see FIG. 8A controller bracket 501). The casters 2 are heavy duty, swivel, polyurethane and wielded to the chassis framing 101. The rubber bumpers 117 are attached for protection of the operator's ankles and surrounding construction objects that the cart 1 may come in contact with. Each of the cart floor panels 103, 104, 105, and compartment top panels 106, 107, are constructed of light weight material strong enough to support objects placed on them and are affixed to the cart chassis framing 101. A gap is left between cart floor front left 104 and cart floor front right 105 so that the laser down 8 (FIG. 2) may pass the cart 1 to the floor for targeting. Each of the compartment panels 108, 109, 110, 111, 112, are constructed of strong light weight material and affixed to the cart chassis framing 101.

In FIG. 6 of the present invention the telescopic mast 3 is secured to the cart chassis framing 101 by first attaching the two mast clamp back plates 118, setting the telescopic mast 3 in place and completing the mast clamp assembly 124 by bolting in place the two mast clamp front plates 119.

The preferred embodiment of overhead drill and anchor press includes these powered components: [(FIG. 6) controller 5, DC power supply 127], [(FIG. 7A) servo motor #1 401, servo motor #2 402, servo motor #3 403, drill #1 430, drill #2 434, laser 413, and turret mounted camera (not shown in attached drawings)]. The above listed components are powered by the (FIG. 6) DC power supply 127, which draws its power from the (FIG. 6) battery 128 (wire and wiring connections are not shown in the attached drawings). The battery 128 is charged by the battery charger 129, which is plunged into a standard outlet for charging.

Figure 7:
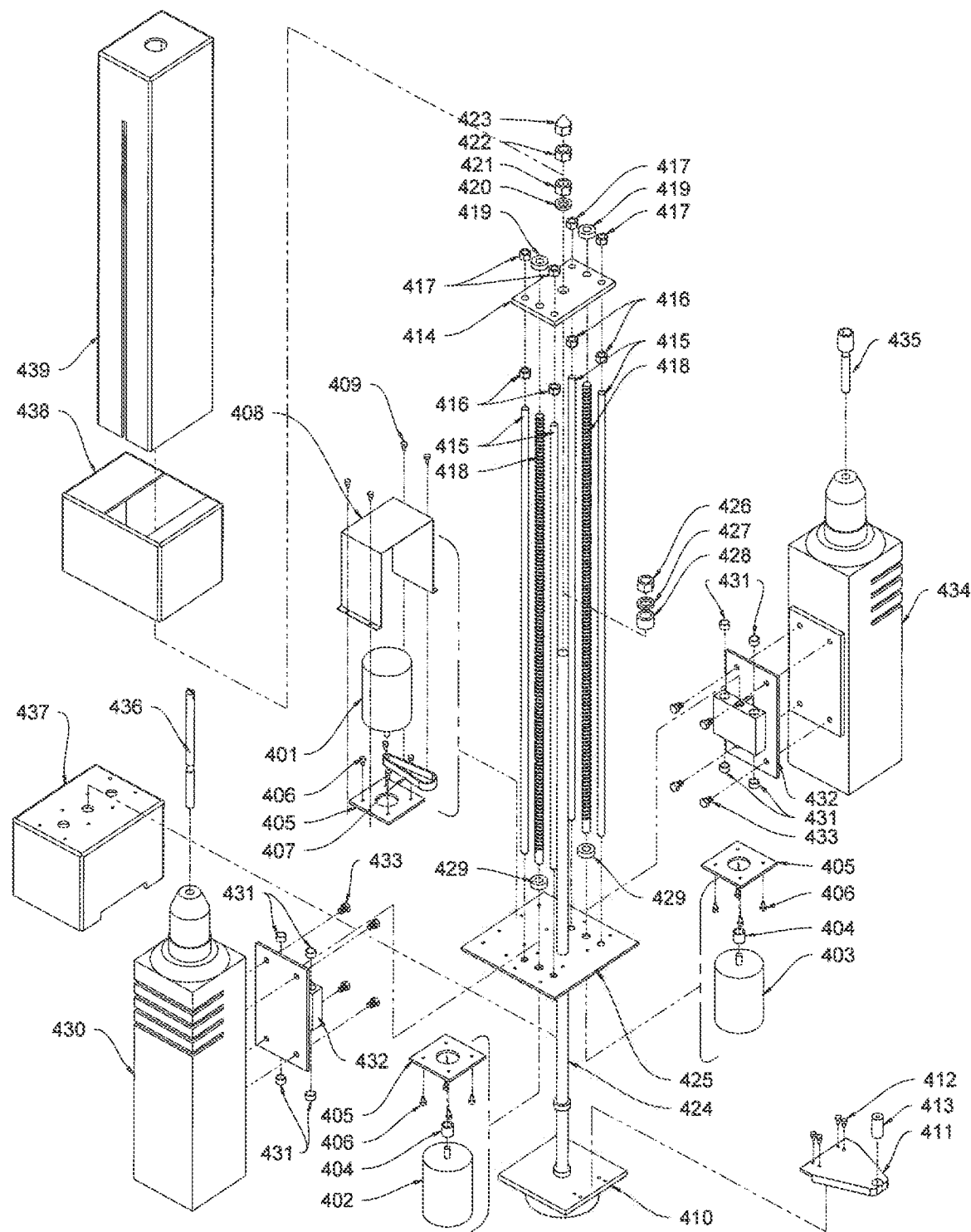
FIG. 7 is an exploded view of the preferred embodiment of the turret component to the overhead drill and anchor press.

FIG. 7A is and exploded view of the preferred embodiment of the turret component to the overhead drill and anchor press. The main shaft 424 has a solid connection to the main shaft mounting plate 410. The base plate 425 and all components mounted to it are designed to rotate around the main shaft 424. The linear guide shafts 415 are solid mounted to the base plate 425 with a threaded top for attaching the top plate 414. The ball screws 418 are held in place to the base plate 425 through the ball screw bearing 429 and the top plate 414 with the ball screw lock nut. The holes in the top plate 414 that receive the ball screws 418 are bearinged for ball screw 418 rotation.

In FIG. 7A the belt 407 is placed around the main shaft 424 and the shaft of the servo motor #1 401. (The belt connection between the main shaft 424 and the servo motor #1 401 may also be achieved through gears in lieu of a belt). This servo motor #1 401 is affixed to the base plate 425 (with a protection housing 408 affixed above it) turns the base plate 425 about the main shaft 424 for positioning of the drills during operation.

The servo motor #2 402 and servo motor #3 403 are affixed to the base plate 425 and connected to their respective ball screw 418 with a shaft coupling 404. The ball screw 418 drives the carrier 432 which has a threaded hole in the center and two sets of linear bearings (carrier bearings 431) pressed into the carriers 432 for smooth linear movement along the linear guide shafts 415.

The two drills, drill #1 430 and drill #2 434, are standard drills capable of these functions separately: drill, hammer, and hammer drill. These drills have no handle but have been designed to attached to the carriers 432 and have a plug for wiring connection to the controller thru the cord 503 see FIG. 8A, FIG. 8B (wire and wiring connections are not shown in the attached drawings).

In FIG. 7A of the present invention the turret component has three sections of protective cover constructed of light weight material designed to keep dust and debris out of the moving parts of this assembly. The turret top cover 439 is one piece with an opening on either side to allow for the carriers 432 to travel up and down. The turret base upper cover 438 and turret base lower cover 437 can be split into two sections for securing to base plate 425.

Figure 8A:
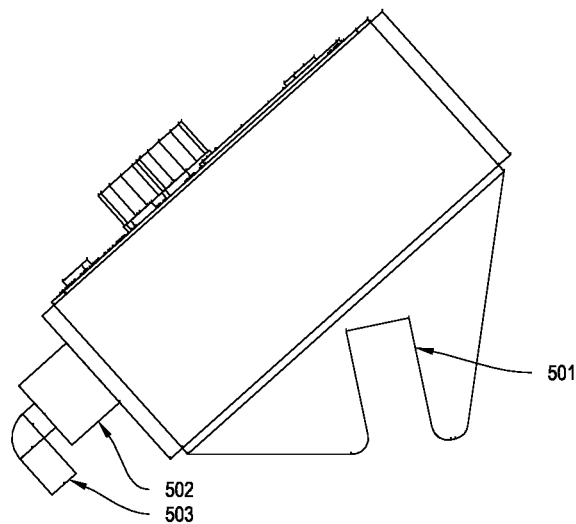
FIG. 8A is an enlarged side view of the preferred embodiment of the controller unit to the overhead drill and anchor press.
Figure 8B:
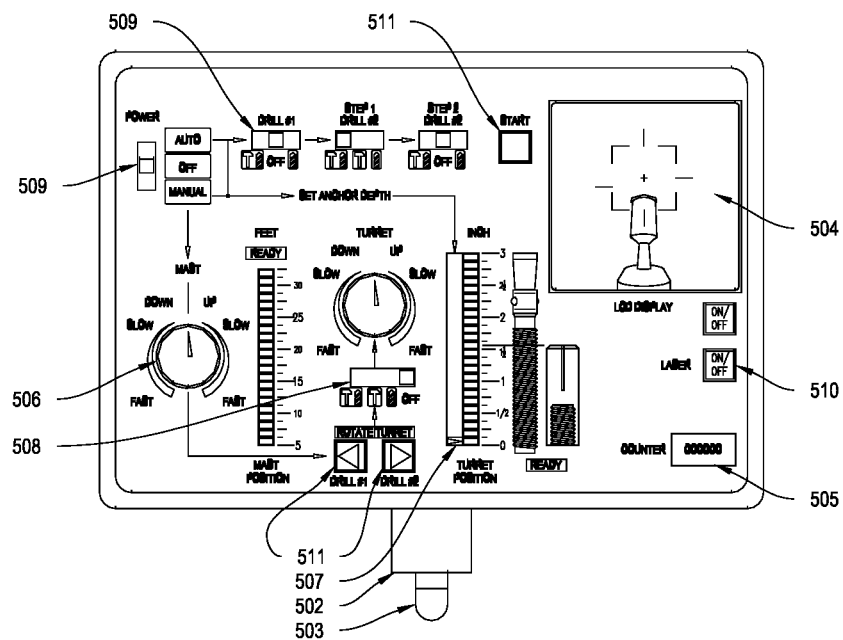
FIG. 8B is an enlarged top view of the preferred embodiment of the controller unit of the overhead drill and anchor press.
Figure 8C:
FIG. 8C is the controller unit symbol legend.
Figure 8C:
Figure 8C:
Figure 11:
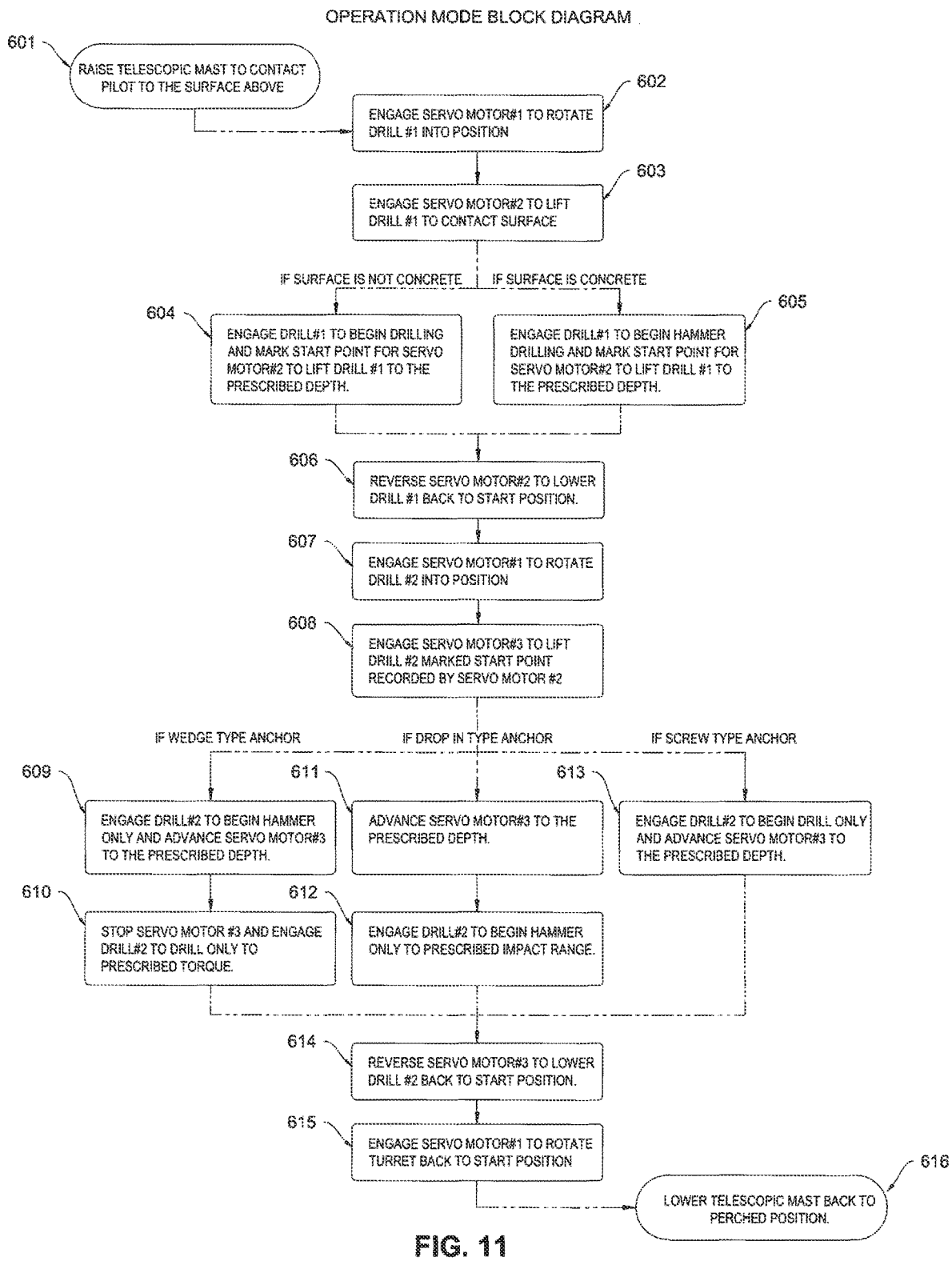
FIG. 11 is the operation mode block diagram of the operating sequence for the overhead drill and anchor press.

FIGS. 8A and 8B the overhead drill and anchor press is equipped with a controller capable of selecting between automatic mode and manual mode. In either mode the operator may select each drill's operating mode based on the type of surface and anchor type to be installed. If the operator has selected AUTO mode then the operator will need to make the selections for both drill operations and the anchor depth (with the slide switch 507) before pressing the start button 511. FIG. 8C is the symbol legend for the controller. FIG. 11 is the operation mode block diagram which illustrates the sequence of operations programmed to the controller in AUTO mode.

FIG. 8B the controller also has the manual mode selection. If the operator selects the manual mode, then the operator will need to process each sequence using the rotary switches 506, selector switch 508, and momentary switches 511. FIG. 11 is the operation mode block diagram which illustrates the sequence of operations that will be controlled manually with the controller in MANUAL mode.

Figures 9A, 9B:
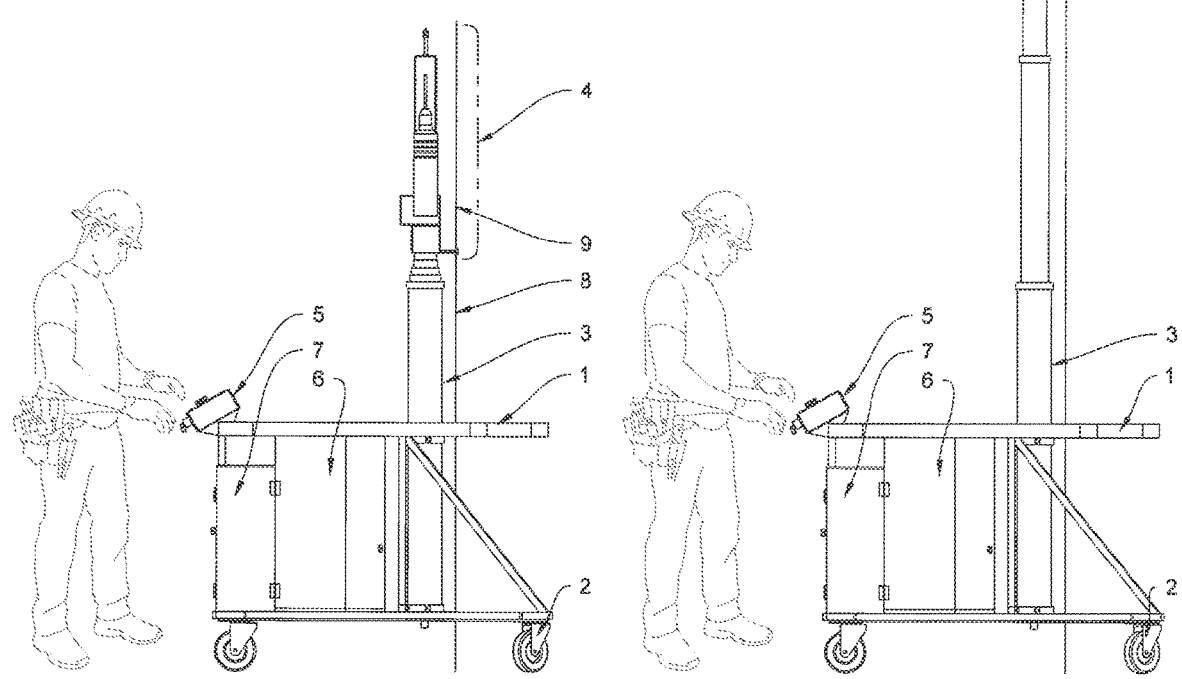
FIG. 9A is an elevation view of the right side of the overhead drill and anchor press in operation mode at the perched position with the laser on for sighting the target.
FIG. 9B is an elevation view of the right side of the overhead drill and anchor press in operation mode "sequence 1" showing the mast extended to contact the pilot tip to the construction surface above.

FIG. 9A is an elevation view of the right side of the overhead drill and anchor press in operation mode at the perched position with the laser on for sighting the target. FIG. 9B is an elevation view of the right side of the overhead drill and anchor press in operation mode "sequence 1" showing the mast extended to contact the pilot tip to the construction surface 10 above.

FIG. 10A is an enlarged top view of the turret in operation mode in the turret start position with the laser in position of the target. FIG. 10B is an enlarged top view of the turret in operation mode at "sequence 2" with the drill #1 in position of the target. FIG. 10C is an enlarged elevation view of the right side in operation mode at "sequence 4" with the drill #1 advanced into the prescribed drilling depth of the surface. FIG. 10D is an enlarged top view of the turret in operation mode at "sequence 6" with the drill #2 in position of the target. FIG. 10E is an enlarged elevation view of the right side in operation mode at "sequence 8.1" with the drill #2 and anchor advanced into the prescribed depth of the surface. FIG. 10F is an enlarged top view of the turret in operation mode at "sequence 10" rotated back to the start position with the laser in position of the target. FIG. 11 is the operation mode block diagram of the operating sequence for the overhead drill and anchor press. The above described FIGS. 10A, B, C, D, E, and F can be referenced to FIG. 11 Operation mode block diagram.

Figure 12A:
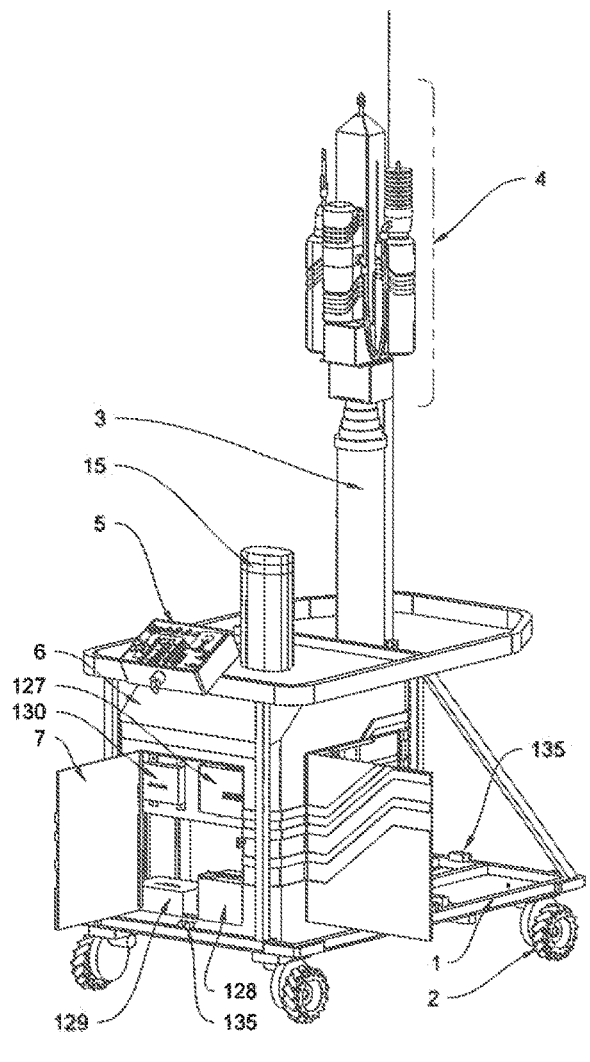
FIG. 12A shows an isometric view of the embodiment with the compartment doors in the open position. View is looking at the right rear.
Figure 12B:
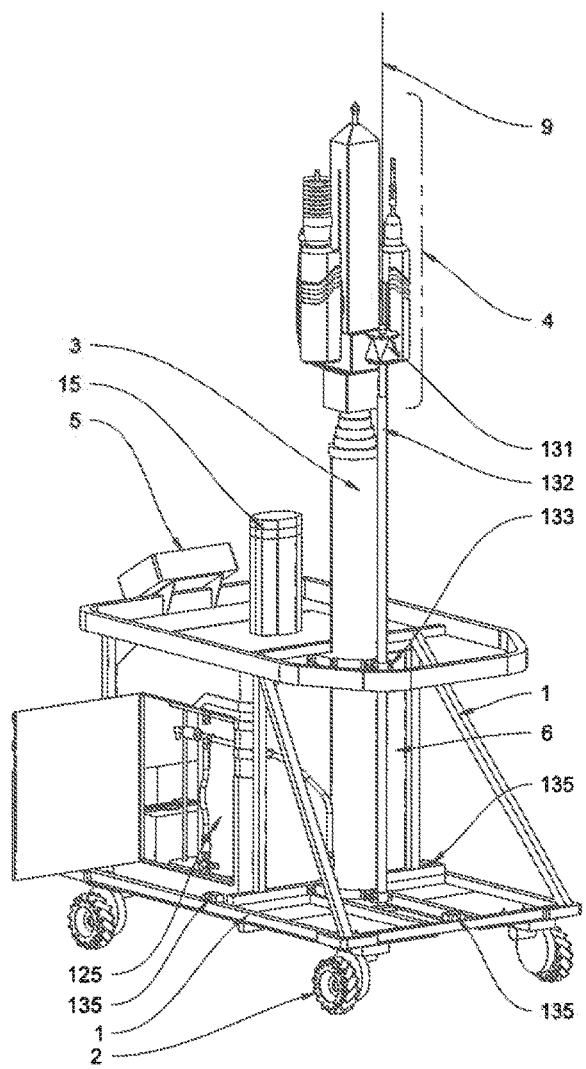
FIG. 12B shoes an isometric view of the embodiment with the compartment doors in the open position. View is looking at the right front.
Figure 16:
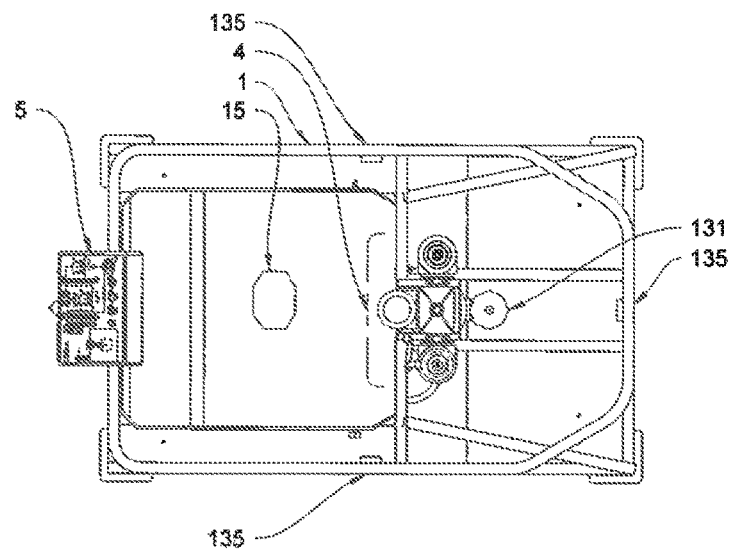
FIG. 16 is a plan view of the top of the embodiment showing all the major components.
Figures 13, 14, 15:
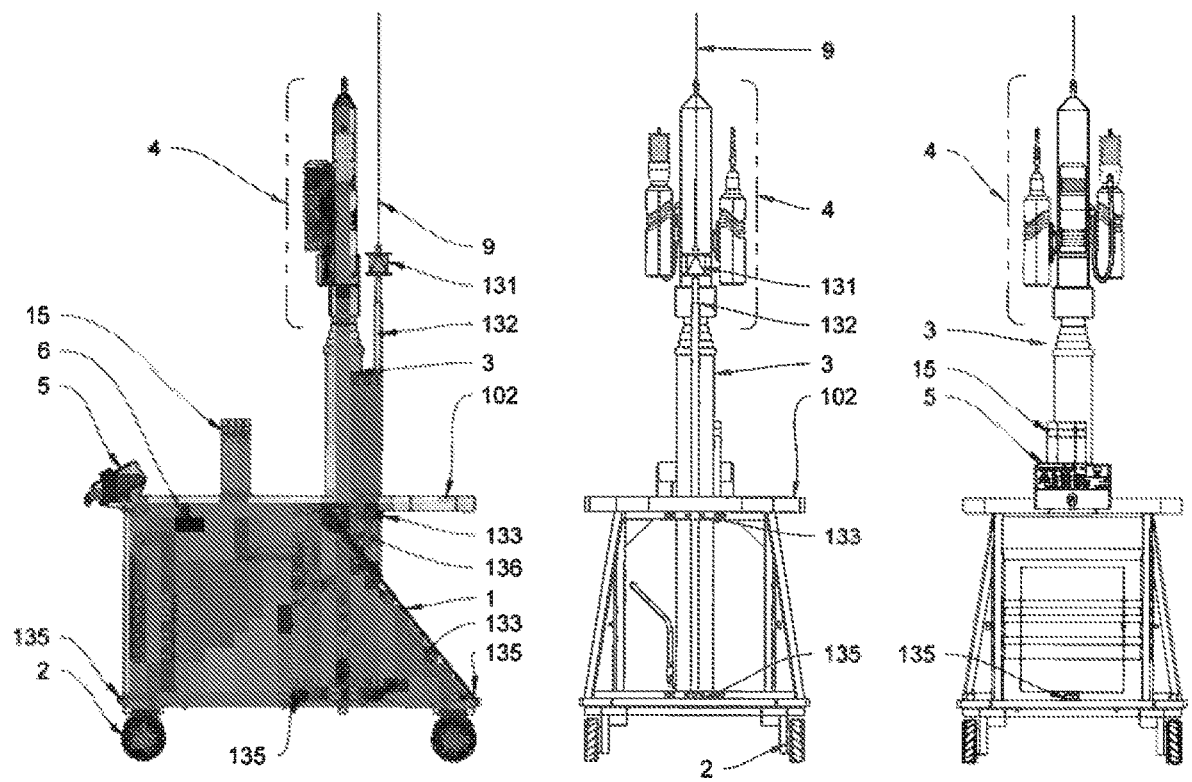
FIG. 13 is an elevation view of the right side of the embodiment showing all the major components.
FIG. 14 is an elevation view of the front of the embodiment showing all the major components.
FIG. 15 is an elevation view of the back of the embodiment showing all the major components.

FIG. 12A and FIG. 12B are isometric views showing the preferred embodiment of the overhead drill and anchor press and includes these major components: a protective compartment 6, with an illuminated top cover 15, cart chassis 1, on casters or motorized omnidirectional wheels 2, a telescopic mast 3, a turret assembly 4, a controller 5, an air reservoir tank 125, a DC power supply 127, a battery 128, a battery charger 129, and an onboard controller 130. The assembled embodiment of the overhead drill and anchor press is designed to be manually pushed or operated autonomously between target locations and sized to fit through standard framed door openings on a construction project. The onboard controller 130 is configured with to operate the motorized omnidirectional wheels 2 upon directional input from the "Total Station" interface or remote input from the handheld controller by the operator. The Light Detection and Ranging "LIDAR" sensors 135 are arranged on all sides of the cart chassis 1 to provide feedback to the onboard controller 130. The LIDAR sensors 135 determine distance between the chassis and obstructions or obstacles for the purpose of autonomously navigating about its environment. The embodiment is fitted with mounts for an adjustable height prism staff 132. These prism staff mounts 133 have been arranged to align the prism 131 to the to-be-drilled bit position.

The prism 131 is a component of the "Total Station" and provides a means of tracking for determining its "X,Y,Z coordinates" with reference to the "BIM" model. The prism staff 132 is adjustable in height for the purpose of raising the prism higher than the turret assembly 4 to maintain line of sight to the "Total Station." When drilling holes and or installing anchors on a construction project, all overhead utilities and building components need to coordinate. Laser 9 points up from the top of the prism to indicate the target location for further visual confirmation and approval by the operator.

Figure 17:
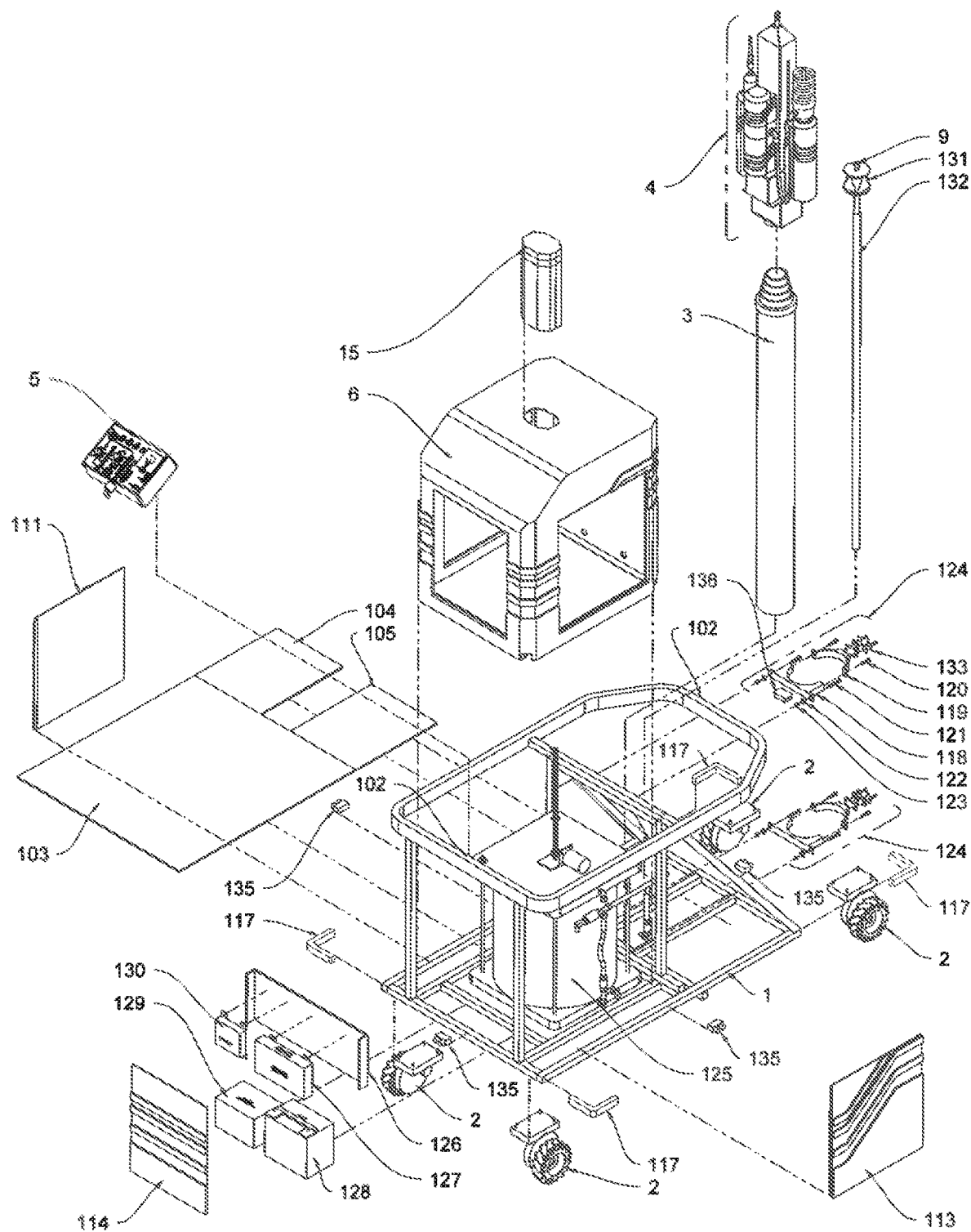
FIG. 17 is an exploded view of the motorized cart with reference to placements of the major components.

The telescopic mast 3 is clamped vertically to the cart chassis 1. The telescopic mast is designed to lift the drill turret assembly 4 up to the work surface. To prevent the embodiment from possible tip-over, a 3-axis gyroscope 136 is arranged to monitor the vertical alignment of the mast and report back to the onboard controller 130. The onboard controller is configured to limit the height that the mast will be allowed to extend when the cart chassis is in an un-level position. FIG. 17 is an exploded view further illustrating the assembly of major components to the cart chassis.

FIG. 18 is and exploded view of the preferred embodiment of the turret assembly 4 to the overhead drill and anchor press. The dust collector assembly 450 is mounted to the turret assembly and configured to operate while the drill #1 430 is in operation. The drill carriers 432 have been designed in two segments: the carrier 432 and the drill mounting plate 440. Two guide bolts 442 connect the carrier to the drill mounting plate with a rubber spacer 441 between them. The rubber spacer cushions against the reverberating action that drill #1 imposes on the carrier 432. The isolation of the vibrations from the hammer drill effects prevents damage to the ball screws 418.

Figure 19:
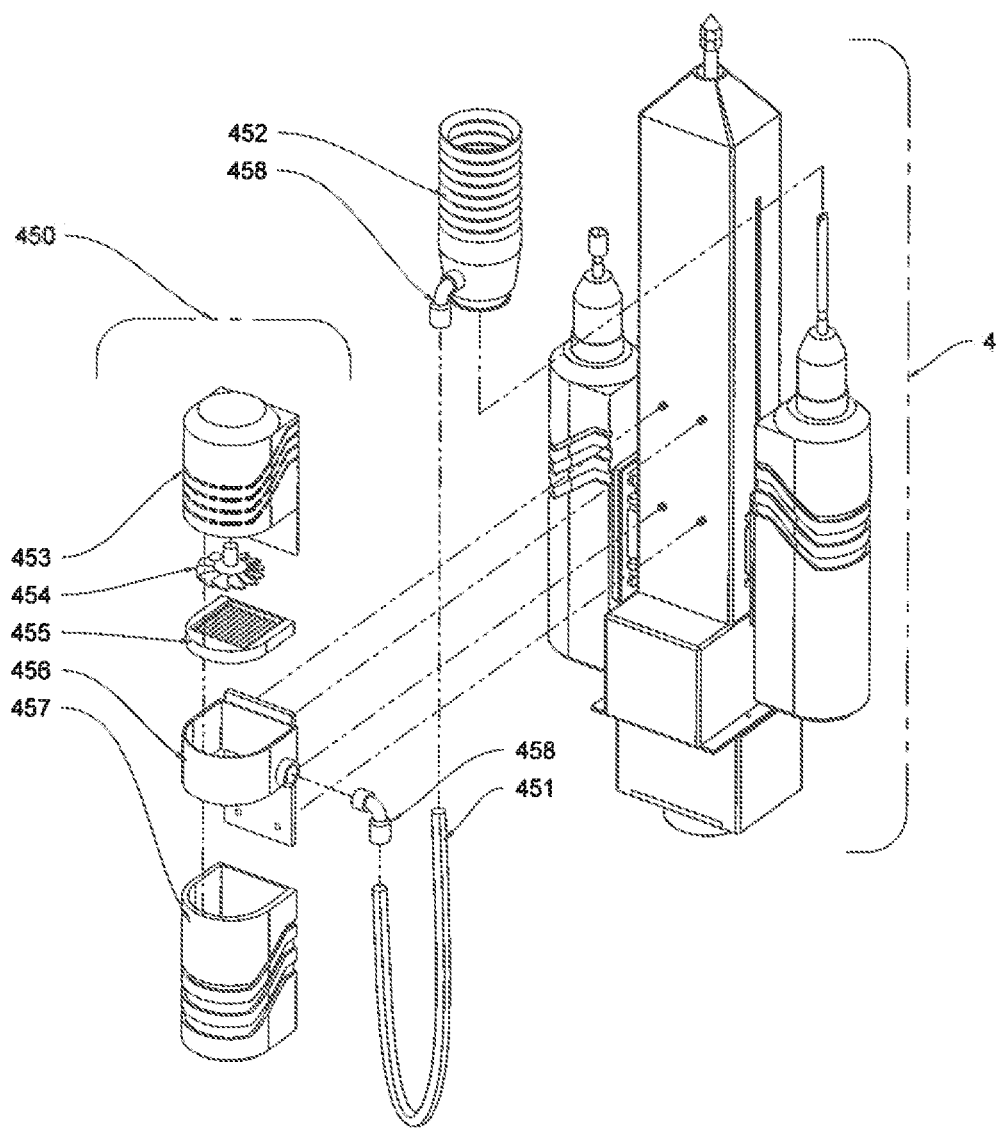
FIG. 19 is and exploded view of a preferred embodiment of a dust collector and reference to the mounting location on the turret.

FIG. 19 is and exploded view of the dust collector assembly 450. The dust collector is comprised of: an assembly housing exhaust port 453, a fan motor and fan blades 454, a filter 455, the intake port 456, the removable dust collector bucket 457, flexible tubing 451, tubing elbows 458, and a dust collector cup 452. The dust collector assembly is configured to operate while the drill #1 is drilling. The dust collector cup is a shroud that affixes to the top of drill #1 and is constructed of material designed to flex as the drill moves. The flexible cup is configured to surround the drill bit and contain the dust while the vacuum pulls the dust into the dust collector bucket 457. The dust collector bucket is accessible by the operator when the mast is retracted, and the contents can be disposed of as it reaches capacity.

Figure 20A:
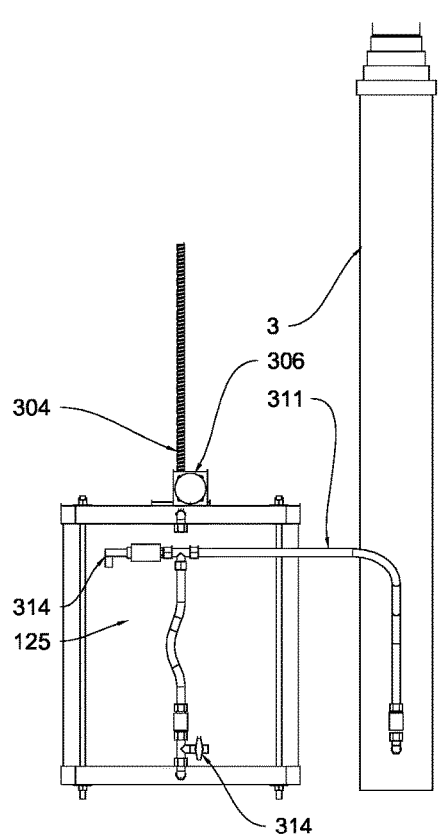
FIG. 20A is a side view of an air reservoir tank embodiment and attachment to the telescopic mast.
Figure 20B:
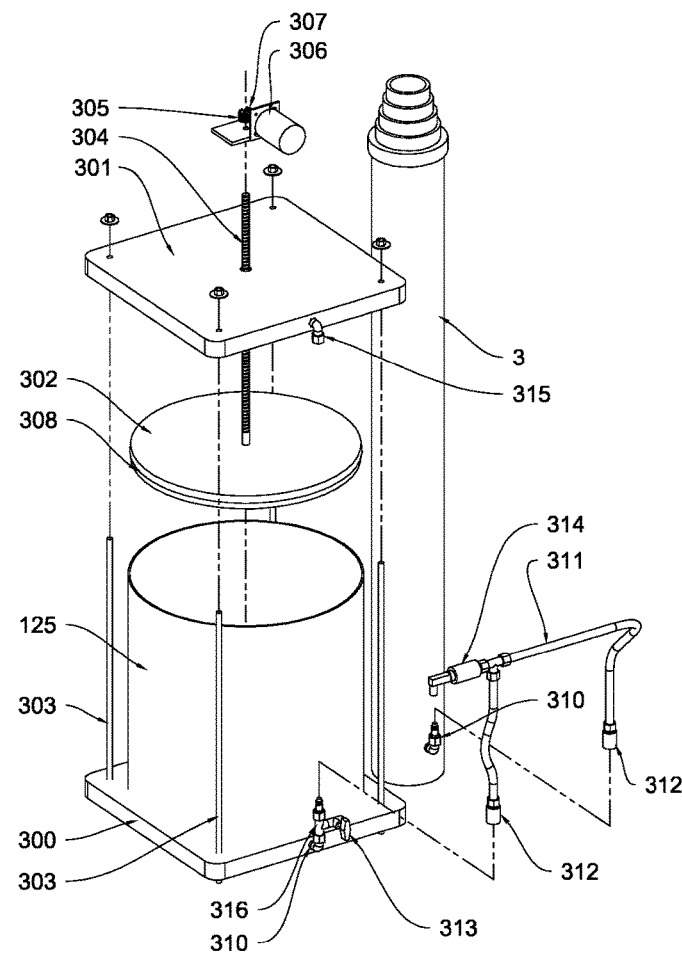
FIG. 20B is an exploded view of an air reservoir tank and referenced attachment to the telescopic mast.

FIG. 20A is a side view of the air reservoir tank embodiment and attachment to the telescopic mast. FIG. 20B is an exploded view of the air reservoir tank embodiment consisting of these components: the air reservoir tank cylinder 125, cylinder base 300, cylinder top 301, piston 302, piston seal 308, bolt down rods 303, drive screw 304, gear wheel 305, screw 307, and servo motor 306. This tank embodiment is connected to the telescopic mast by these pneumatic components: elbow 310, pneumatic tubing tee 316, quick release fittings 312, tubing 311, electronic air pressure switch 314. The air reservoir tank is designed to transfer air into and out of the telescopic mast for raising and lowering the turret. This method of using the environment's air eliminates the need for compressed gasses. The piston within the air reservoir tank cylinder is positioned by the drive screw 304 which is driven by a worm screw assembly. The servo motor 306 is constructed with a worm screw 307 at the end and butted up against the gear wheel 305 which is threaded onto the drive screw 304.

Using the worm screw drive assembly provides precise control of the extension of the mast and pressure applied to the surface overhead. The electronic pressure switch 314 is configured to report to the onboard controller the applied pressure. The reported pressure identifies to the controller that the drill sequencing may commence. Upon completion of the drilling or drilling and anchor installation the servo motor 306 will control the speed at which the telescopic mast returns.

To maneuver, the overhead drill and anchor press about the project has been designed with motorized omnidirectional wheels 2. Each motorized wheel is equipped with a motor arranged to drive the wheel in either direction and a range of speeds for versatile maneuvering. The wheels are mounted to the cart chassis at a fixed position and can drive the cart chassis in any direction. FIG. 22A shows the motorized omnidirectional wheels 2 arrangement with a name for each wheel referenced by the drive diagram.

Figure 22B:
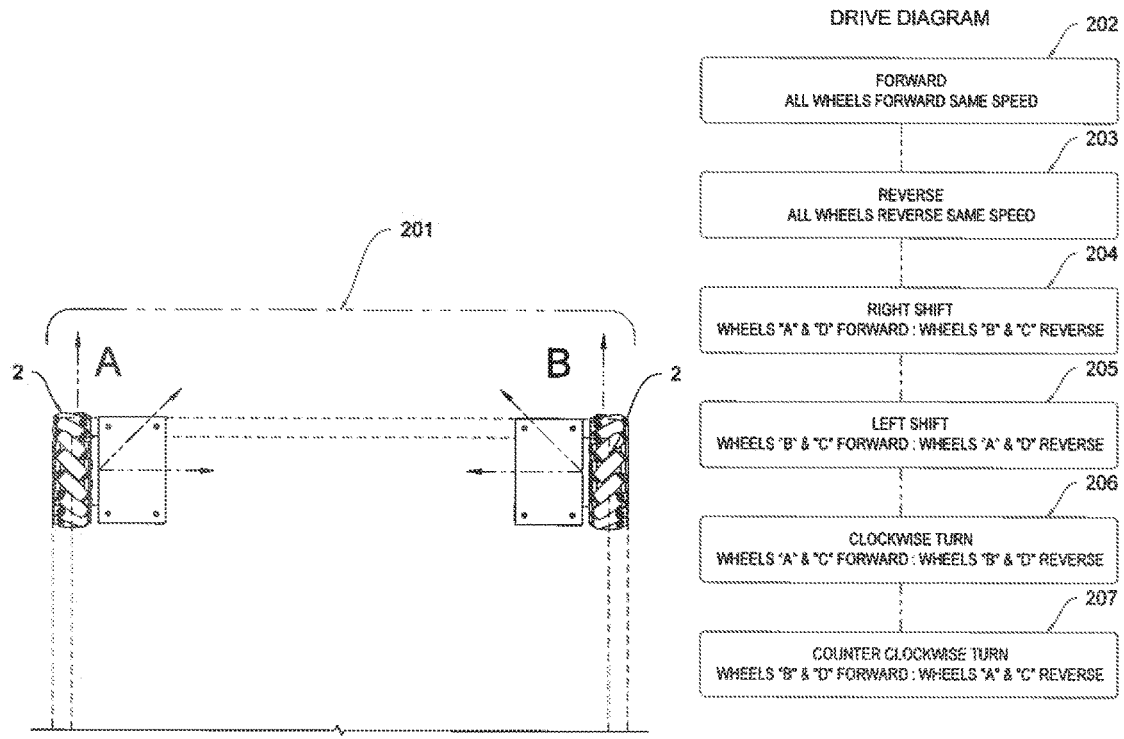
FIG. 22B is a drive diagram of the motorized wheel operation.
Figure 22A:
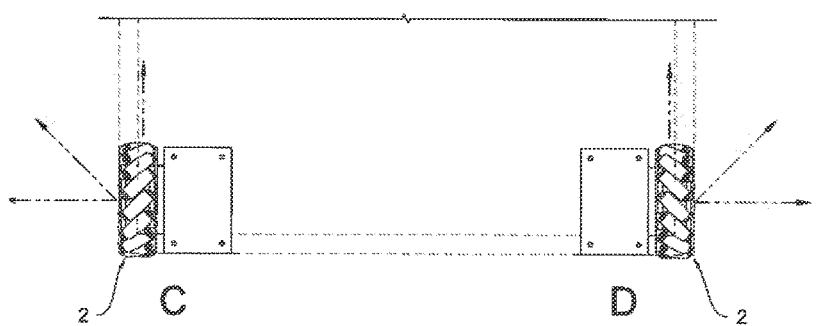
FIG. 22A shows the motorized omnidirectional wheels arrangement.

FIG. 22B the drive diagram matrix showing direction of wheel rotation to achieve direction of movement. Forward movement is achieved by rotating all wheels forward at the same speed 202. Reverse is achieved by rotating all wheels backwards at the same speed 203. Right shift or moving the unit to the right is achieved by rotating wheels "A" and "D" forward and wheels "B" and "C" reverse 204. Left shift or moving the unit to the left is achieved by rotating wheels "B" and "C" forward and wheels "A" and "D" reverse 205. Rotating the unit clockwise is achieved by rotating wheels "A" and "C" forward and wheels "B" and "D" reverse 206. Rotating the unit counterclockwise is achieved by rotating wheels "B" and "D" forward and wheels "A" and "C" reverse 207.

Figure 21:
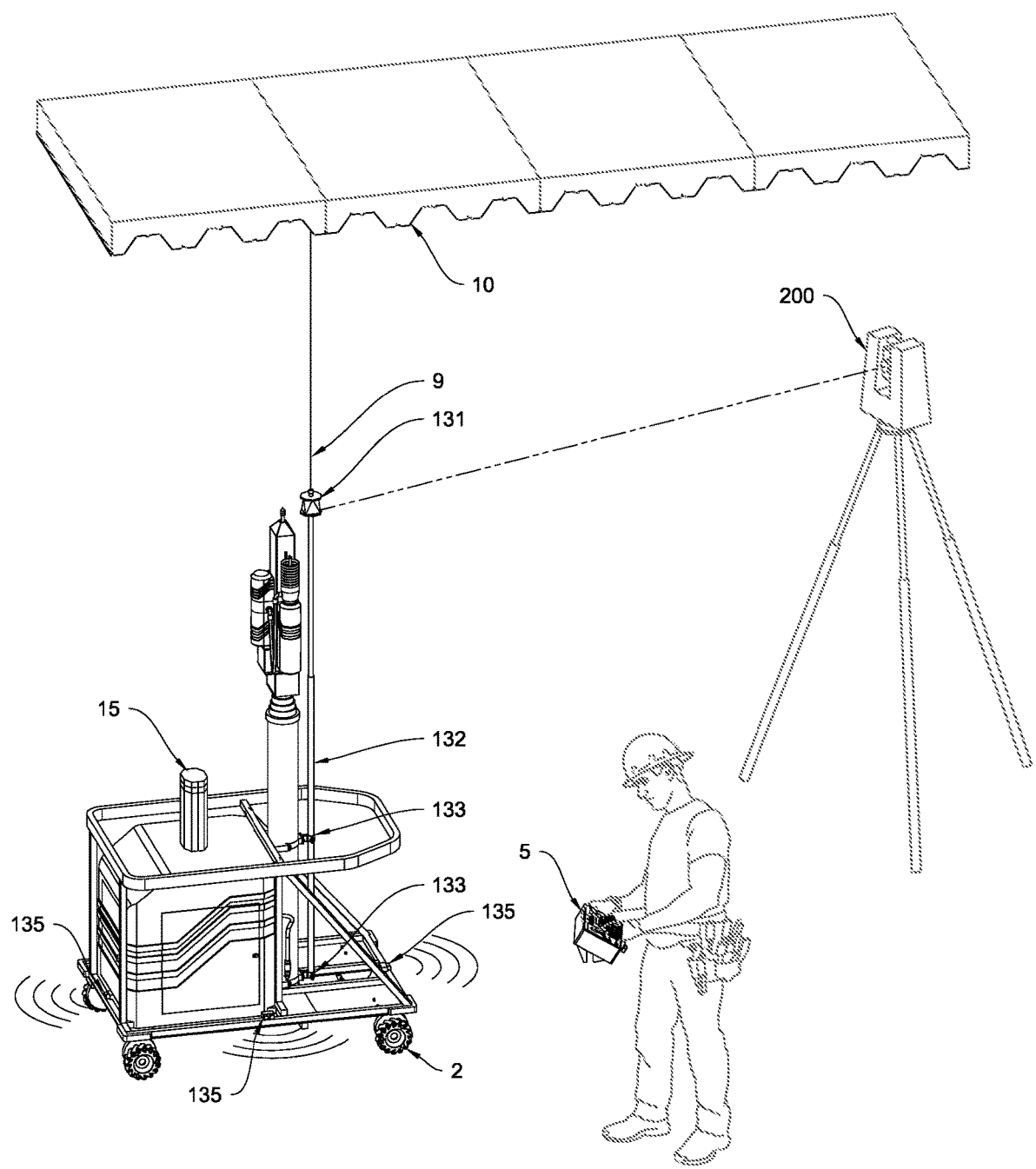
FIG. 21 shows worker with the handheld controller, the "Total Station," as tracking the position of the prism mounted to the overhead drill and anchor press, and the laser identifying its position overhead.

FIG. 21 depicts the "Total Station" tracking the position of the prism 21. The "Total Station" is generally set up by loading a "BIM" model image and the X,Y,Z. coordinates of all point locations to be surveyed on the project. Once the "Total Station" is in place its physical location with reference to the BIM model is identified by moving the prism above physical control points and synchronized with those control points within the BIM model. The "Total Station" then can direct northing and easting movements to align the prism to a layout point. The on-board controller of overhead drill and anchor press interfaced with "total Station" receiving the movement directions and utilizing the lidar sensors 135 to move into position to drill hole into the surface above. The operator uses a handheld controller to monitor the point layout process and can execute manual commands as needed.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An overhead drill press, comprising:
   an onboard controller;
   a cart chassis;
   a shaft connected to the cart chassis, the shaft being configured to selectively move vertically between a down position and one of a plurality of raised positions;
   a turret attached to an upper portion of the shaft;
   a first drill connected to a first portion of the turret and a second drill connected to a second portion of the turret;
   a first motor connected to the shaft which when activated by the onboard controller causes the turret and the first and second drills to selectively rotate between different rotational positions;
   a second motor configured to move the first drill vertically between a lowered position and a raised position;
   a third motor configured to move the second drill vertically between a lowered position and a raised position;
   a plurality of motorized drive wheels; and
   a sensor suitable for measuring distance, an angular velocity sensor, said sensors configurable to report measurement data to the onboard controller;
   wherein the onboard controller is configured to control the shaft to move the shaft to position the turret adjacent to a surface to be drilled, to control the second motor to raise the first drill to a drilling position of the surface to be drilled, to control the first drill to drill a hole in the surface, to control the second motor to lower the first drill away from the surface, further wherein the onboard controller is configured with a pressure switch and a laser to control speed of movement of the shaft and the pressure the drill exerts onto a drilling surface.

2. The overhead drill press of claim 1, further wherein the onboard controller is configured to control the first motor to rotate the turret to position the second drill below the drilled hole in the surface, to control the third motor to raise the second drill to the hole drilled in the surface, and to control the second drill to set an anchor in the drilled hole in the surface.

3. The overhead drill press of claim 1, wherein the onboard controller is configured to control the speed and direction of the motorized drive wheels.

4. The overhead drill press of claim 1, wherein the onboard controller is configured suitably with the angular velocity sensor to control the height of travel of the telescopic mast.

5. The overhead drill press of claim 1, wherein the cart chassis further comprises a mount suitable for securely receiving a reflective prism.

6. The overhead drill press of claim 1, wherein the onboard controller is configured suitably with the sensor suitable for measuring distance to maneuver the cart chassis to suitably control the motorized drive wheels so to avoid obstacles during movement.

7. The overhead drill press of claim 1, wherein the onboard controller is configured to access BIM files and layout application and is suitable for point layout navigation.

8. The overhead drill press of claim 1, further wherein a handheld controller is remotely connected to the onboard controller.

9. An overhead drill press, comprising:
an onboard controller;
a cart chassis;
a shaft connected to the cart chassis, the shaft being configured to selectively move vertically between a down position and one of a plurality of raised positions;
a turret attached to an upper portion of the shaft;
a first drill connected to a first portion of the turret and a second drill connected to a second portion of the turret;
a first motor connected to the shaft which when activated by the onboard controller causes the turret and the first and second drills to selectively rotate between different rotational positions;
a second motor configured to move the first drill vertically between a lowered position and a raised position;
a third motor configured to move the second drill vertically between a lowered position and a raised position;
a plurality of motorized drive wheels; and
a sensor suitable for measuring distance, an angular velocity sensor, said sensors configurable to report measurement data to the onboard controller;
wherein the onboard controller is configured to control the shaft to move the shaft to position the turret adjacent to a surface to be drilled, to control the second motor to raise the first drill to a drilling position of the surface to be drilled, to control the first drill to drill a hole in the surface, to control the second motor to lower the first drill away from the surface,
further wherein the onboard controller is configured with a pressure switch and a laser to control speed of movement of the shaft and the pressure the drill exerts onto a drilling surface; and
wherein a dust collection assembly is mounted on the turret assembly and configured to operate while the drill is active.

10. The overhead drill press of claim 9, wherein the dust collection assembly further comprises a flexible shroud arranged proximate to the drill bit and a flexible tube for collection and containment of dust.

11. The overhead drill press of claim 10, further wherein the onboard controller is configured to control the first motor to rotate the turret to position the second drill below the drilled hole in the surface, to control the third motor to raise the second drill to the hole drilled in the surface, and to control the second drill to set an anchor in the drilled hole in the surface.

12. An overhead drill press, comprising:
an onboard controller;
a cart chassis;
a shaft connected to the cart chassis, the shaft being configured to selectively move vertically between a down position and one of a plurality of raised positions;
a turret attached to an upper portion of the shaft;
a first drill connected to a first portion of the turret and a second drill connected to a second portion of the turret;
a first motor connected to the shaft which when activated by the onboard controller causes the turret and the first and second drills to selectively rotate between different rotational positions;
a second motor configured to move the first drill vertically between a lowered position and a raised position;
a third motor configured to move the second drill vertically between a lowered position and a raised position;
a plurality of motorized drive wheels; and
a sensor suitable for measuring distance, an angular velocity sensor, said sensors configurable to report measurement data to the onboard controller;
wherein the onboard controller is configured to control the shaft to move the shaft to position the turret adjacent to a surface to be drilled, to control the second motor to raise the first drill to a drilling position of the surface to be drilled, to control the first drill to drill a hole in the surface, to control the second motor to lower the first drill away from the surface,
further wherein the onboard controller is configured with a pressure switch and a laser to control speed of movement of the shaft and the pressure the drill exerts onto a drilling surface; and
further comprising an air reservoir tank assembly comprising a cylinder, a cylinder base and top, a drive screw, and a worm drive motor assembly.

13. The overhead drill of claim 12, wherein the air reservoir tank assembly is operably configured to move air into and withdraw air out of the telescopic mast.

14. The overhead drill of claim 13, wherein the air reservoir tank assembly further comprises an electronic air-pressure switch configured to report data to the onboard controller.

15. The overhead drill of claim 14, further wherein the onboard controller is configured to control the first motor to rotate the turret to position the second drill below the drilled hole in the surface, to control the third motor to raise the second drill to the hole drilled in the surface, and to control the second drill to set an anchor in the drilled hole in the surface.

* * * * *